United States Patent

Schreyer et al.

[11] 4,108,014
[45] Aug. 22, 1978

[54] OBLIQUE LAY SPROCKET WHEEL AND CHAIN CONSTRUCTION

[75] Inventors: Kenneth D. Schreyer, Clarence; Harold V. Hawkins, Williamsville, both of N.Y.

[73] Assignee: Columbus McKinnon Corporation, Tonawanda, N.Y.

[21] Appl. No.: 755,426

[22] Filed: Dec. 29, 1976

[51] Int. Cl.² ............... F16H 55/30; F16G 13/02
[52] U.S. Cl. ..................... 74/243 H; 74/250 R
[58] Field of Search ............ 74/243 H, 243 R, 250 R

[56] References Cited

U.S. PATENT DOCUMENTS

| 662,768 | 11/1900 | Crowe | 74/243 H |
| 1,412,068 | 4/1922 | Stahl | 74/243 H |

Primary Examiner—Leonard H. Gerin

[57] ABSTRACT

An oblique lay sprocket wheel utilizes a pocket construction wherein load bearing portions of successive pockets are overlapped. Also, a bent link chain construction is shown which allows the use of a four pocket wheel.

4 Claims, 13 Drawing Figures

FIG.11

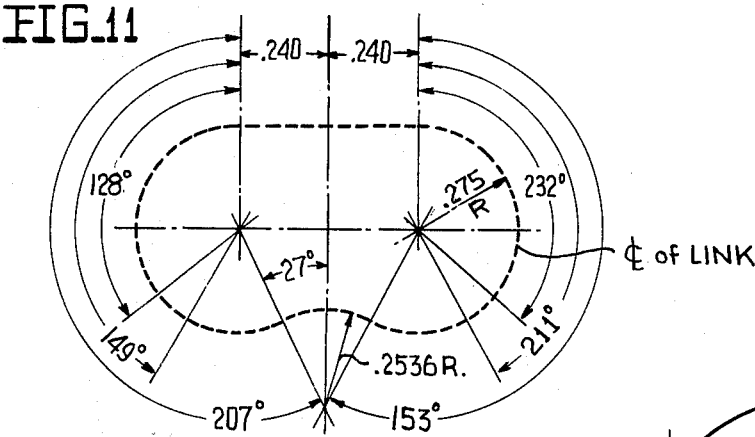

FIG.12

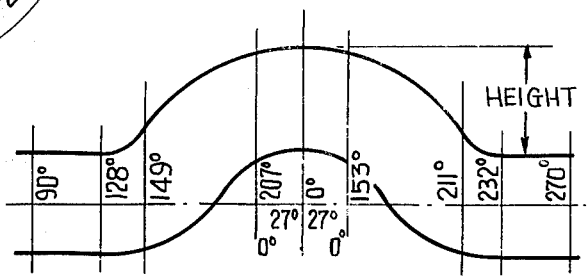

FIG.13

CALCULATED SHAPE OF LINK

| ANGLE L.H. SIDE | HEIGTH | ANGLE R.H. SIDE | ANGLE L.H. SIDE | HEIGHT | ANGLE R.H. SIDE | ANGLE L.H. SIDE | HEIGHT | ANGLE R.H. SIDE | ANGLE L.H. SIDE | HEIGHT | ANGLE R.H. SIDE |
|---|---|---|---|---|---|---|---|---|---|---|---|
| 128° | .0000 | 232° | 156° | .0802 | 204° | 184° | .1736 | 176° | 27° | .2116 | 0° |
| 129° | .0000 | 231° | 157° | .0846 | 203° | 185° | .1759 | 175° | 26° | .2125 | 1° |
| 130° | .0003 | 230° | 158° | .0888 | 202° | 186° | .1781 | 174° | 25° | .2133 | 2° |
| 131° | .0008 | 229° | 159° | .0929 | 201° | 187° | .1803 | 173° | 24° | .2142 | 3° |
| 132° | .0015 | 228° | 160° | .0970 | 200° | 188° | .1825 | 172° | 23° | .2151 | 4° |
| 133° | .0023 | 227° | 161° | .1010 | 199° | 189° | .1846 | 171° | 22° | .2159 | 5° |
| 134° | .0033 | 226° | 162° | .1050 | 198° | 190° | .1866 | 170° | 21° | .2167 | 6° |
| 135° | .0046 | 225° | 163° | .1089 | 197° | 191° | .1885 | 169° | 20° | .2174 | 7° |
| 136° | .0060 | 224° | 164° | .1126 | 196° | 192° | .1904 | 168° | 19° | .2181 | 8° |
| 137° | .0076 | 223° | 165° | .1163 | 195° | 193° | .1922 | 167° | 18° | .2188 | 9° |
| 138° | .0095 | 222° | 166° | .1200 | 194° | 194° | .1939 | 166° | 17° | .2195 | 10° |
| 139° | .0115 | 221° | 167° | .1236 | 193° | 195° | .1956 | 165° | 16° | .2200 | 11° |
| 140° | .0138 | 220° | 168° | .1271 | 192° | 196° | .1973 | 164° | 15° | .2207 | 12° |
| 141° | .0163 | 219° | 169° | .1305 | 191° | 197° | .1988 | 163° | 14° | .2212 | 13° |
| 142° | .0192 | 218° | 170° | .1339 | 190° | 198° | .2003 | 162° | 13° | .2217 | 14° |
| 143° | .0222 | 217° | 171° | .1372 | 189° | 199° | .2018 | 161° | 12° | .2222 | 15° |
| 144° | .0256 | 216° | 172° | .1404 | 188° | 200° | .2032 | 160° | 11° | .2226 | 16° |
| 145° | .0293 | 215° | 173° | .1436 | 187° | 201° | .2046 | 159° | 10° | .2231 | 17° |
| 146° | .0333 | 214° | 174° | .1466 | 186° | 202° | .2058 | 158° | 9° | .2234 | 18° |
| 147° | .0378 | 213° | 175° | .1496 | 185° | 203° | .2071 | 157° | 8° | .2237 | 19° |
| 148° | .0427 | 212° | 176° | .1525 | 184° | 204° | .2082 | 156° | 7° | .2240 | 20° |
| 149° | .0481 | 211° | 177° | .1554 | 183° | 205° | .2094 | 155° | 6° | .2243 | 21° |
| 150° | .0528 | 210° | 178° | .1582 | 182° | 206° | .2105 | 154° | 5° | .2245 | 22° |
| 151° | .0576 | 209° | 179° | .1609 | 181° | 207° | .2116 | 153° | 4° | .2247 | 23° |
| 152° | .0623 | 208° | 180° | .1636 | 180° |  |  |  | 3° | .2248 | 24° |
| 153° | .0669 | 207° | 181° | .1662 | 179° |  |  |  | 2° | .2249 | 25° |
| 154° | .0714 | 206° | 182° | .1687 | 178° |  |  |  | 1° | .2250 | 26° |
| 155° | .0759 | 205° | 183° | .1712 | 177° |  |  |  | 0° | .2250 | 27° |

OBLIQUE LAY SPROCKET WHEEL AND CHAIN CONSTRUCTION

BACKGROUND OF THE INVENTION

Contemporarily there are two types of pocket wheels for imparting pull on a chain trained thereover, as the wheel is rotated. In one, the periphery of the wheel is provided with successive pockets which respectively receive a link lying parallel to the axis of wheel rotation and a link lying perpendicular to such axis. Such a construction is employed in the Burrows U.S. Pat. No. 3,266,331 of Aug. 16, 1966.

The other type is the so-called "oblique lay" pocket wheel in which the pockets are so disposed that successive links lie at an angle to the center plane of the wheel. Such a construction is exemplified by the Herman U.S. Pat. No. 325,534 of Sept. 1, 1885 and the Crowe patent 662,768 of Nov. 27, 1900. In these patents, the links lie at approximately 45° to the center plane so that successive links still lie in perpendicular planes when passing over the wheel. In a recent development as shown in the Royer et al U.S. Pat. No. 3,415,135, assigned in common herewith, an angle of lay considerably less than 45° was proposed in order materially to reduce the onset of chain link fatigue.

In the conventional type of pocket wheel as exemplified in the patent first mentioned, two types of oscillatory loads are imposed upon the chain as the wheel is rotated. One oscillatory load is due to the entering (or leaving) of a loaded link into a parallel pocket of the wheel and the other oscillatory load is due to the entering (or leaving) of a loaded link into a perpendicular pocket of the wheel. In an oblique lay wheel, each link leaves or enter its pocket in the same way so that only one type of oscillatory load is imposed on the load system. Whereas the oscillatory load can become very large due to resonance in either system, it is easier to control and to minimize oscillatory loading in an oblique lay system. Moreover, the bending stresses induced in the links as they enter or leave a pocket of a correctly designed oblique lay wheel can be reduced.

BRIEF SUMMARY OF THE INVENTION

The present invention relates to still further improved oblique lay wheels wherein improved wear characteristics are achieved; wherein reduction in oscillatory motion of the hoist head about a horizontal axis lying in the center plane of the pocket wheel is achieved; wherein reduction in oscillatory motions about a vertical axis through the point of suspension is achieved; and wherein resonance-inducing forces along the axis of the chain are reduced.

The present invention also relates to a new form of chain link for wheels having a small number of pockets, i.e., four pockets, thus allowing the advantages of an oblique lay wheel while materially increasing the mechanical advantage in applying the tension force to the chain. This is particularly advantageous in manually operated pullers or hoists wherein the reduction in the number of pockets not only allows the puller to be made physically smaller for the same load capacity, but also allows less force input for the same lever length.

Basically, the pocket wheel of this invention is characterized by the fact that the load-bearing end of each pocket extends past the center plane of the wheel. This places the load bearing point between each link and its pocket in line with the center plane of the pocket wheel and also centers the load on the middle of the links, reducing wear on the pocket wheel at the load bearing ends of the pockets and on the links, and reducing oscillatory or rocking motions of the hoist about a horizontal axis lying in or parallel to the center plane of the pocket wheel. Moreover, the angle of lay is such that adjacent links do not experience any relative twisting as they enter or leave their pockets. This reduces wear on the links at their interlink contact areas and eliminates foreshortening of the chain due to twisting. Each link is confined to two components of motion as it enters or leaves its pocket. One component is rotation in the plane of the link preceeding it and the other component is rotation in its own plane.

BRIEF DESCRIPTION OF THE DRAWINGS

FIG. 11 is a diagram illustrating dimensional details of the novel link in plan view;

FIG. 12 is a diagram illustrating dimensional details of the novel link in elevation; and FIG. 13 is a chart, relating to FIGS. 11 and 12, giving dimensions for the novel link of standard wire size, length and width.

DETAILED DESCRIPTION OF THE INVENTION

Referring at this time more particularly to FIGS. 1-5, the principles of the improved pocket wheel according to the present invention will be seen therein.

Figure 3:
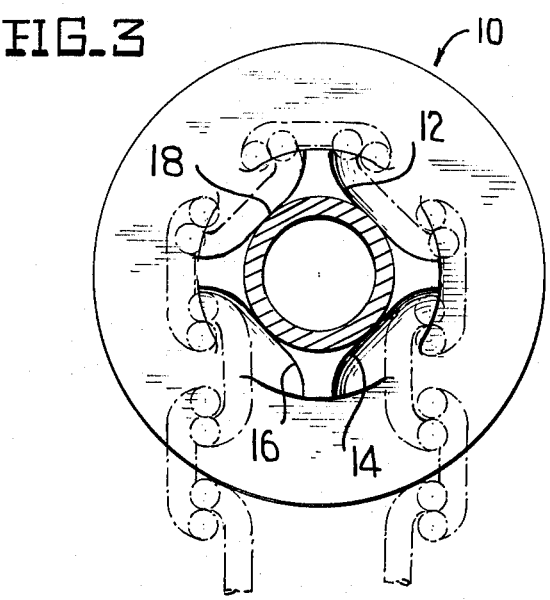
FIG. 3 is a transverse section taken along the plane of section line 3—3 in FIG. 1.

These Figures illustrate an eight pocket wheel constructed according to this invention and as may be used typically in an electric hoist. The wheel comprises a body indicated generally by the reference character 10 provided with two sets of circumferentially spaced pockets around its periphery. One set of pockets is illustrated in FIG. 3 and the pockets thereof are indicated respectively by the reference characters 12, 14, 16 and 18. The two series or sets of pockets are arranged symmetrically with respect to the center plane indicated by the reference character 20 in FIG. 1 and with the two sets of pockets being circumferentially staggered with respect to each other as is illustrated. Three pockets of the lefthand set are shown in FIG. 1 and these are indicated respectively by the reference characters 22, 24 and 26.

Figure 1:
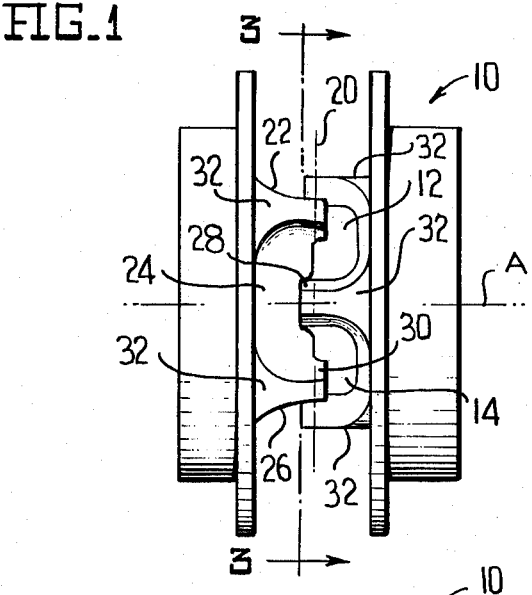
FIG. 1 is an elevational view illustrating a pocket wheel according to this invention.
Figure 2:
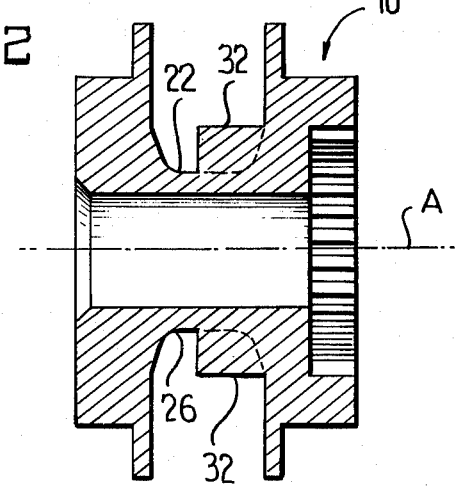
FIG. 2 is an axial section taken through the wheel of FIG. 1.

For the purpose of description, the direction of rotation of the lift wheel in lifting a load supported by an associated chain is chosen such that the top of the wheel as shown in FIG. 1 rotates into the plane of the paper as it is rotated about the axis of rotation A as shown in FIG. 2. Thus, the load bearing end of each pocket as viewed in FIG. 1 is the lowermost one regardless of whether the load is being lifted or lowered, i.e., whether the link is entering or leaving its associated pocket. A characteristic of the present invention is that each load bearing end of a pocket extends past the center plane 20 as, for example is indicated at 28 for the pocket 22 or at 30 for the pocket 24. Thus, the load bearing ends of the pocket of the two sets thereof overlap relative to each other on either side of the center plane 20, as is illustrated.

Figure 4:
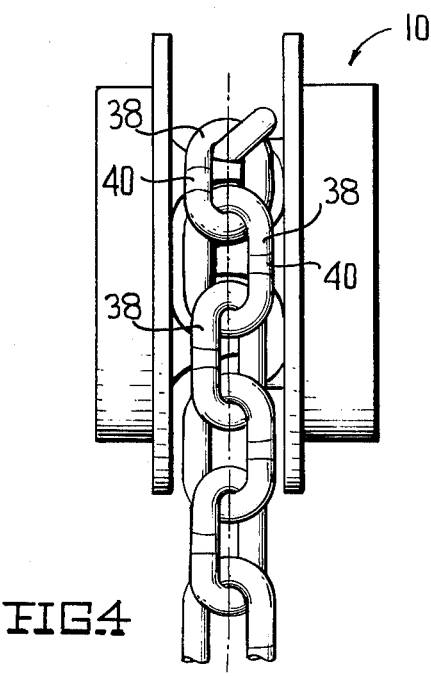
FIG. 4 is a view similar to FIG. 1 but showing the chain.
Figure 5:
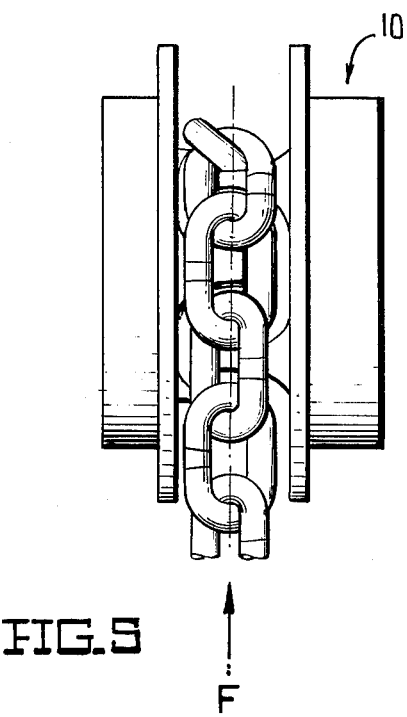
FIG. 5 is a view similar to FIG. 4 but showing the wheel rotated to advance one link.

In the aforesaid Royer et al patent and other pocket wheel designs there are offset loadings on the pocket wheel and links, alternating to the left and right of the pocket wheel center plane. According to this invention, the load bearing end of each pocket preferably is extended past the wheel center plane as far as possible without interferring with the unwelded barrel or leg of the link, as shown in FIGS. 4 and 5. This provides increased bearing area support and consequent reduction in pocket wheel and chain link wear. Further, it places the center of the load bearing in line with the center plane of the pocket wheel so that oscillatory motion of the pocket wheel and associated hoist head are substantially eliminated, thereby decreasing the associated component of longitudinal oscillatory forces imposed on the chain.

The circumference of the wheel in the regions of the two sets of pockets is cylindrical, albeit interrupted by the pockets themselves, leaving the cylindrical surface portions such as those indicated by the reference characters 32 in FIGS. 1 and 2. The interrupted cylindrical portions 32 support the welded sides or legs 38 of the chain, as is illustrated in FIGS. 4 and 5, specifically providing support for the "weld bulges" 40 of the chain link.

The angle of lay, that is the angle included between the plane of each link and the center plane 20 and designated herein $\theta$ is a function of the total number of pockets in the wheel, according to the following:

$$\tan 2\theta = 1/\cos\beta \cdot$$

where $\beta = 360°/n$, $n$ equal total number of pockets.

Such angle of lay provides for no interlink twisting. That is to say, each link as it enters or leaves it pocket has two components of motion only, one defined as the angle $\delta$ which is its angle or rotation within the plane of the link preceeding it and the angle $\delta$ which is the angle of rotation in its own plane. The relationships among these angles are as follows:

$$\tan\delta = \tan\beta\cos\theta$$

$$\tan\delta = \sin\delta\tan\theta.$$

As noted above, by following the above relationships, there is no twisting between adjacent links as they enter or leave their pockets and this materially reduces the wear in the interlink areas of the chain and minimizes oscillatory forces caused by foreshortening of the chain due to relative twisting of adjacent links, as in the prior art, whereby resonanceinduced forces are decreased as the pocket wheel is operated.

That is to say, there is a much smoother action on the chain as the wheel is rotated as for example is shown in FIGS. 4 and 5 whereby the lifting force F has no significant degree of oscillatory forces superimposed thereon due to the individual links entering the pocket.

Another feature of the invention is illustrated in the remaining Figures of the drawings.

Figure 6:
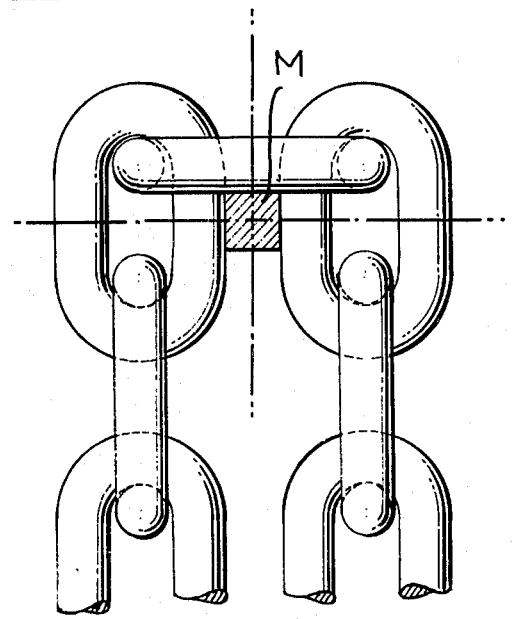
FIG. 6 is a diagrammatic view showing the possible construction of a four pocket wheel using conventional lay of the chain.
Figure 8:
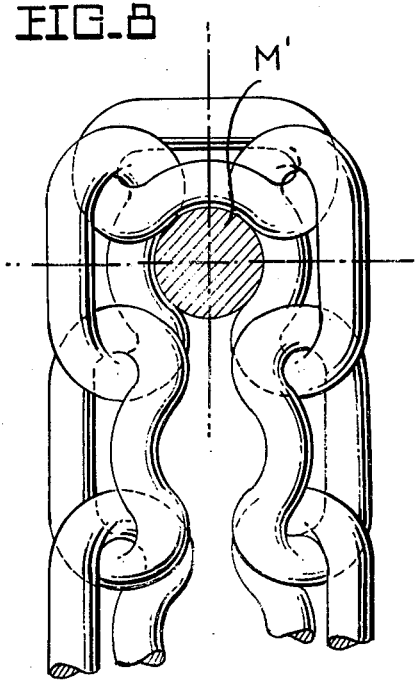
FIG. 8 is a diagrammatic view showing the practicality of a four pocket wheel, oblique lay, with the novel chain link according to this invention.
Figure 7:
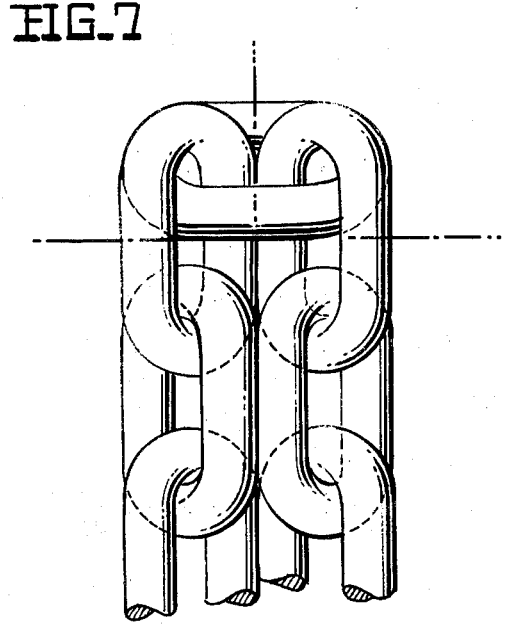
FIG. 7 is a diagrammatic view showing that a four pocket wheel is physically impractical with oblique lay.

FIG. 6 illustrates a conventional lay of chain links in a pocket wheel having a total of four pockets and illustrates that in a conventional pocket wheel, room is left only for a small square section of material as indicated by the reference character M at the center of the pocket wheel. FIG. 7 illustrates that for a four pocket wheel utilizing oblique lay, there is no or substantially no material left in the center portion of the pocket wheel and that therefore it is impractical if not impossible to form an oblique lay wheel having only four pockets. However, if a four pocket oblique lay wheel could be utilized, the above described advantages thereof could be employed while achieving an increased mechanical advantage in imparting the pulling or lifting force on the chain. This would be particularly advantageous in manually operated pullers because it would not only allow the dimensions of the assembly to be smaller, but would also allow reduced manual force input (assuming a lever of the same length) for the same pulling force. The configuration as is shown in FIG. 8 allows a significant amount of material as indicated at M' to remain in the center of the pocket wheel and is achieved by the novel chain link configuration illustrated in FIGS. 9 and 10.

Figure 9:
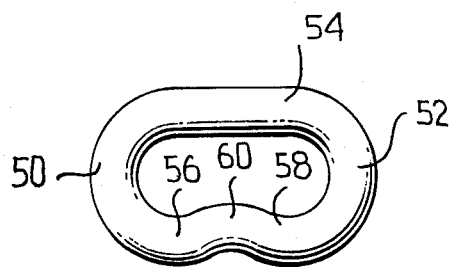
FIG. 9 is a plan fiew of the novel link.
Figure 10:
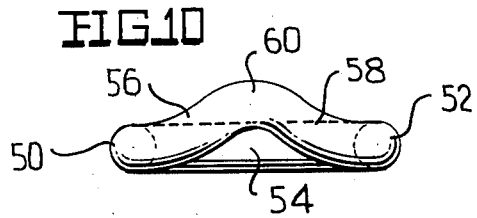
FIG. 10 is an elevation of the novel link.

In FIG. 9, it will be seen that the novel chain link in plan view employs the usual semicircular or generally semicircular opposite end portions 50 and 52 joined by the welded leg or side 54 and an opposite side which has end sections 56 and 58 which extend arcuately as extensions of the end sections 50 and then are joined by a reverse-curved center section 60, as shown. As illustrated in FIG. 10, the deformed or bent leg comprising the section 56, 58 and 60 is arucately deformed upwardly out of the normal plane of the link, substantially as is shown. FIGS. 11 and 12 respectively show the plan and elevational views and the relative dimensioning of the bent leg of the link whereas FIG. 13 is a chart illustrating the values related to FIGS. 11 and 12 for a bent link of standard wire stock size, length and width.

What is claimed is:

1. In an oblique lay pocket wheel for exerting tension on a chain trained thereover as the wheel is rotated, which comprises a body adapted to be rotated about a drive axis and having a transverse center plane normal to said axis, said body having a cylindrical portion extending on opposite sides of said center plane, a first series of chain link pockets in said cylindrical portion on one side of said center plane and circumferentially spaced from each other around said axis to present interrupted cylindrical portions therebetween, a second series of chain link pockets in said body on the other side of said center plane and circumferentially spaced from each other around said axis to present interrupted cylindrical portions therebetween, the pockets of said second series being circumferentially staggered with respect to the pockets of said first series whereby successive links of a chain may be received successively in the pockets of said first and second series thereof with the outer barrel of each link which is received in a pocket of said first series lying on a cylindrical portion separating adjacent pockets of said second series, and vice versa, whereby the plane of each such link lies at a fixed angle $\theta$ with respect to said center plane, the improvement wherein:

the end of each of said first series of pockets which trails, with respect to the direction of rotation of the wheel, extends radially outwardly to an associated cylindrical portion and projects at its radially outward portion past said center plane from said one side to said other side thereof and the end of each of said second series of pockets which trails, with respect to the direction of rotation of the wheel, extends radially outwardly to an associated cylindrical portion and projects at its radially outward portion past said center plane from said other side to said one side thereof whereby the load bearing point between each link and its pocket is substantially in line with said center plane.

2. In an oblique lay pocket wheel as defined in claim 1 wherein $\tan 2\theta = 1/\cos\beta$ where $\beta = 360°/n$, $n$ being the total number of pockets in said wheel.

3. In an oblique lay pocket wheel as defined in claim 2 wherein $\tan \delta = \tan \beta \cos \theta$ and $\tan \delta = \sin\delta\tan\theta$ where $\delta$ is the angle of rotation of a trailing link in the plane of the link leading it and $\delta$ is the angle of rotation of said trailing link in its own plane.

4. In an oblique lay pocket wheel as defined in claim 1 wherein there are two pockets in each series thereof, in combination with a chain comprised of a series of links each of which has one side which is straight and the opposite side thereof has its central portion deformed both inwardly toward said one side and outwardly from the plane of the link.

* * * * *